Oct. 23, 1956 C. G. O. MÅNSSON 2,768,353

DEVICE FOR AUTOMATIC LEVEL REGULATION FOR MULTICHANNEL CARRIER-FREQUENCY TRANSMISSION SYSTEMS

Filed May 1, 1952 4 Sheets-Sheet 1

INVENTOR
CARL GUSTAF OLOF MÅNSSON
BY Fredrick L. Haug
ATTORNEY

INVENTOR
CARL GUSTAF OLOF MÅNSSON
BY [signature]
ATTORNEY

Oct. 23, 1956 C. G. O. MÅNSSON 2,768,353
DEVICE FOR AUTOMATIC LEVEL REGULATION FOR MULTICHANNEL
CARRIER-FREQUENCY TRANSMISSION SYSTEMS
Filed May 1, 1952 4 Sheets-Sheet 3

INVENTOR
CARL GUSTAF OLOF MÅNSSON
BY Frederick E. Hane
ATTORNEY

INVENTOR
CARL GUSTAF OLOF MÅNSSON
BY Frederick E. Hane
ATTORNEY

United States Patent Office 2,768,353
Patented Oct. 23, 1956

2,768,353

DEVICE FOR AUTOMATIC LEVEL REGULATION FOR MULTICHANNEL CARRIER-FREQUENCY TRANSMISSION SYSTEMS

Carl Gustaf Olof Månsson, Stockholm, Sweden, assignor to Telefonaktiebolaget L M Ericsson, Stockholm, Sweden, a company of Sweden Application May 1, 1952, Serial No. 285,570
Claims priority, application Sweden May 21, 1951
5 Claims. (Cl. 333—16)

The present invention relates to a device for automatic regulation of the amplification of the repeating or amplification stations in multi-channel transmission systems.

In such systems automatic control and regulating means are generally utilized for adjusting the amplification (gain) of the group amplifiers in dependence upon changes in attenuation, which for different reasons appear on the lines forming part of the system. For this purpose one or several control or pilot currents are together with the signal or speech currents transmitted over the lines. These control or pilot currents are submitted to the same transmitting conditions as are the signal and speech currents and show varying changes of gain in relation to the attenuating conditions within the system, which changes broadly speaking can be considered to represent the changes in gain, which the signal currents are submitted to during the transmission. The control currents will thereby cause the gain of the group amplifiers to vary in such a way, that the gain increases when the level decreases and vice versa.

The variations in attenuation can under certain conditions be considerable, particularly in carrier-frequency transmission systems using open wires, in which case the attenuation varies with both the temperature and the weather conditions. Exceptional external conditions such as ice-formation on the lines, can cause very great increases in attenuation.

In open wire systems the same pair of wires is generally utilized for transmission in both directions, whereby these directions have to take up quite different frequency bands, separated by a vacant frequency space, the so called gap. It appears in practice, that the changes in attenuation, which are caused by variation in the temperature of the wires or in the humidity of surroundings do not take place uniformly over the whole frequency range used for the transmission. The attenuating variations are generally greater at a higher frequency than at a lower one. From a regulating point of view it is most often suitable to conceive the variation in attenuation as divided into two different parts, one part varying with the same amount over the whole frequency band, therefore a parallel displacement of the attenuating curve, the other part representing the difference between the attenuation for two different frequencies, thereby indicating a change in the slope of the attenuating curve.

Within the frequency range for normal open wire systems, the parallel displacement of the attenuation curve is usually considerably greater than is the variation in slope. It has also been found that for certain lines there is most often a fixed relation between these two variations. For a relatively narrow frequency band one can therefore with good result adjust the slope compensation in certain relation to the parallel compensation after having studied said relation by means of measurements at varying states of temperature and weather. Broadly speaking it is true, that the same conditions apply to a wider frequency band, but the uncertainty becomes greater and therefore it can be suitable to compensate the parallel displacement and the slope separately, at least at some of the amplifier stations, forming part of the system.

As mentioned above the regulation is made by means of one or several pilot currents which are sent out at constant level from the transmitting station.

In the amplifying stations and the receiving terminal station control frequencies are selectively taken out in a pilot receiver with a high impedance input, which is connected across the line after the group amplifier. The pilot receiver emits one or several currents, the strength of which has a certain relation to the level of the received control frequency. These currents influence current-sensitive elements in pads or attenuating networks, usually placed in the negative feed-back circuit of an amplifier, in such a way that the level of the control frequency is restored to its original value, in case this level should vary owing to changes in line attenuation.

In such cases where, in accordance with what has been said above, it can be considered with good approximation that the slope variations always have a certain relation to the parallel displacement of the attenuation curve, only one pilot current will be sent out in each direction of transmission. This current can principally be placed anywhere within or in immediate connection with the transmitted frequency band, but it is commonly placed at the margin of the band nearest the gap between the frequency bands of the two directions.

In systems where the transmitted frequency band has such a width or the line attenuation varies irregularly in such a way, that regulation by one pilot frequency cannot be relied upon for giving satisfactory level stability it is customary to send out a second pilot frequency, usually placed in the opposite end of the frequency band, that is, in the upper margin of the upper band and in the lower margin of the lower one. For certain reasons it is then suitable to let the pilot frequency placed nearest to the gap still control the principal (parallel) regulation, whilst the other pilot frequency will influence the slope regulation for the lower as well as for the upper band.

The attenuating networks, influenced by the control currents, can be designed in different ways and contain at least one element, the resistance of which varies in dependence on the strength of these currents. This element generally consists of a thermistor, the resistance of which varies in dependence on the temperature, to which it is heated by the pilot currents. In several previously known systems for multichannel carrier-frequency transmission, attenuating networks are used for the level regulation, having thermistors arranged in their shunt branches. This is in general sufficient in systems using cables as transmission medium, where the necessary variations in the level regulation are small and also the risk of wire breakage is relatively insignificant. The considerably greater level variations, prevailing when using open wires, make it advantageous to use several thermistors in each regulating or attenuating network, whereby it is not necessary to use the thermistors at extremely high heater current values.

Previously developed devices having only one thermistor in the shunt branch are afflicted with the disadvantage that the amplification (gain) will increase to its maximum value in case the control voltage for some reason (e. g. broken wire) drops off. In order to counteract oscillations in an amplifier station or in the whole transmission system, it has under such circumstances been necessary to resort to complicated relay systems which, in case the control frequency drops off, connect to the transmission path a pad of sufficiently great attenuation to reduce the difference between the thus arising maximum amplification and the normal average amplification. Such relay devices, which are necessary in case the control frequency drops off, require the introduction of relay contacts in the transmission path for the signal currents and this constitutes a serious source of trouble. The changes, arising on the connection of a relay-controlled pad, take place momentarily and cause rapid reaction (hunting) on all other amplifiers forming part of the transmission circuit, by means of which the whole carrier-frequency system can be rendered useless for speech transmission. When the trouble, causing the disconnection has ceased, corresponding difficulties in momentarily re-establishing the transmission will take place, since a relatively long time is required to reestablish the whole chain of amplifiers to their normal conditions.

Neither does the dropping off of the control frequency in itself imply, that the transmission path would necessarily be rendered useless for speech transmission. When using relay devices for the blocking of the transmission, these devices are designed in such a way, that the relays are energized and the blocking of the transmission takes place when the level of the control voltage has dropped to a certain limit-value. This is done for the purpose of avoiding that the amplification, which in this case tends to reach its maximum value, becomes so high that self-sustaining oscillations will be set up. The transmission will thereby be rendered unfit for use—until the level of the control voltage has exceeded the abovementioned limit-value—and all proceeding telephone conversations are disconnected.

It appears in practice that the inconveniences caused by rapid disconnection of the proceeding telephone conversations are greater than if the level is slowly decreased to such a low value that conversation is made considerably difficult. For that reason it is to be desired that sudden disconnections are avoided and that when the control frequency ceases, the amplification of the different repeaters is continuously adjusted towards an average amplification. Thus, in many cases it is possible to finish proceeding conversations in a normal manner, notwithstanding the fact that the level decreases and the audibility is considerably reduced. As is well known the dialling signals cannot be transmitted over the transmission medium even at an attenuation where the audibility is sufficient; calling is thus made impossible so that no new calls can be connected over the defective transmission system, which therefore soon will be unloaded.

The device according to the invention for automatic level regulation in multichannel carrier-frequency transmission systems has regulating amplifiers provided with attenuating networks in a negative feed-back circuit and/or in series between the amplifier tubes, which attenuating networks contain a couple of thermistor elements, one situated in a shunt path, the other in a series path, the heating currents of which thermistor elements and thereby resistances are brought to vary in dependence on the level of the control voltages tracing the level conditions of the transmission medium. The invention is mainly characterized by the resulting change in amplification (gain) of the regulating amplifiers being substantially proportional to the quotient between the resistance values of the above mentioned couple of thermistor elements and independent of the product of said resistance values.

The invention will be further described in the following in connection with the embodiments shown in the attached drawing.

Fig. 1 of the drawing shows a block diagram of an intermediary amplifier station (repeater) arranged according to the invention.

Figure 1:
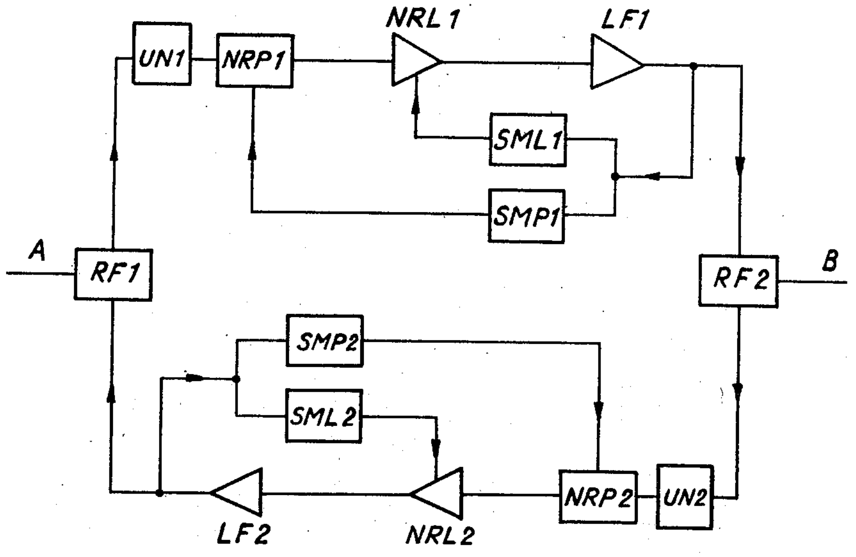

The block diagram in Fig. 1 relates to a two-way station with separate transmitting circuits for the two transmitting directions. This amplifier station is of the type, in which different frequency bands are used for transmission in the opposite directions over the same line, whereby signals belonging to the two transmission directions are separated from one another in the station by means of directional filters RF.

Signals, reaching the amplifier station over the line A and within the one frequency band, are directed by the filter device RF1 to the upper branch on the diagram. This branch contains the fixed equalizing network UN1 and the level regulating devices NRP1 and NRL1 and also the group amplifier LF1, through which devices the corresponding currents evidently flow and these are forwarded to the directional filter RF2, from which they are directed to the line B. In the opposite direction, that is the direction B—A, the currents flow analogously through the network UN2, the level regulating means NRP2 and NRL2 and also the group amplifier LF2.

The amplifiers LF1 and LF2 are feed-back connected to the level regulating devices NRP1, NRL1 and NRP2, NRL2 respectively in such a way, that currents are supplied from the output circuits of the mentioned amplifiers to the so called pilot receivers SMP1, SML1 and SMP2, SML2 respectively, controlling the level regulation devices, which amplifiers are provided with band-filter means, passing to each receiver only the control frequency allotted to each respective receiver. The pilot receivers serve the main purpose of producing two regulating currents out of the received control voltage, both currents being of the same frequency, but of different appearance as a function of the applied control voltage, whereby the sum of the two regulating currents delivered from each pilot receiver is suitably always constant. The latter currents are used for automatic adjustment of the level regulating devices NRL1, NRP1 and NRL2, NRP2 in a manner further described in the following.

Figure 2:
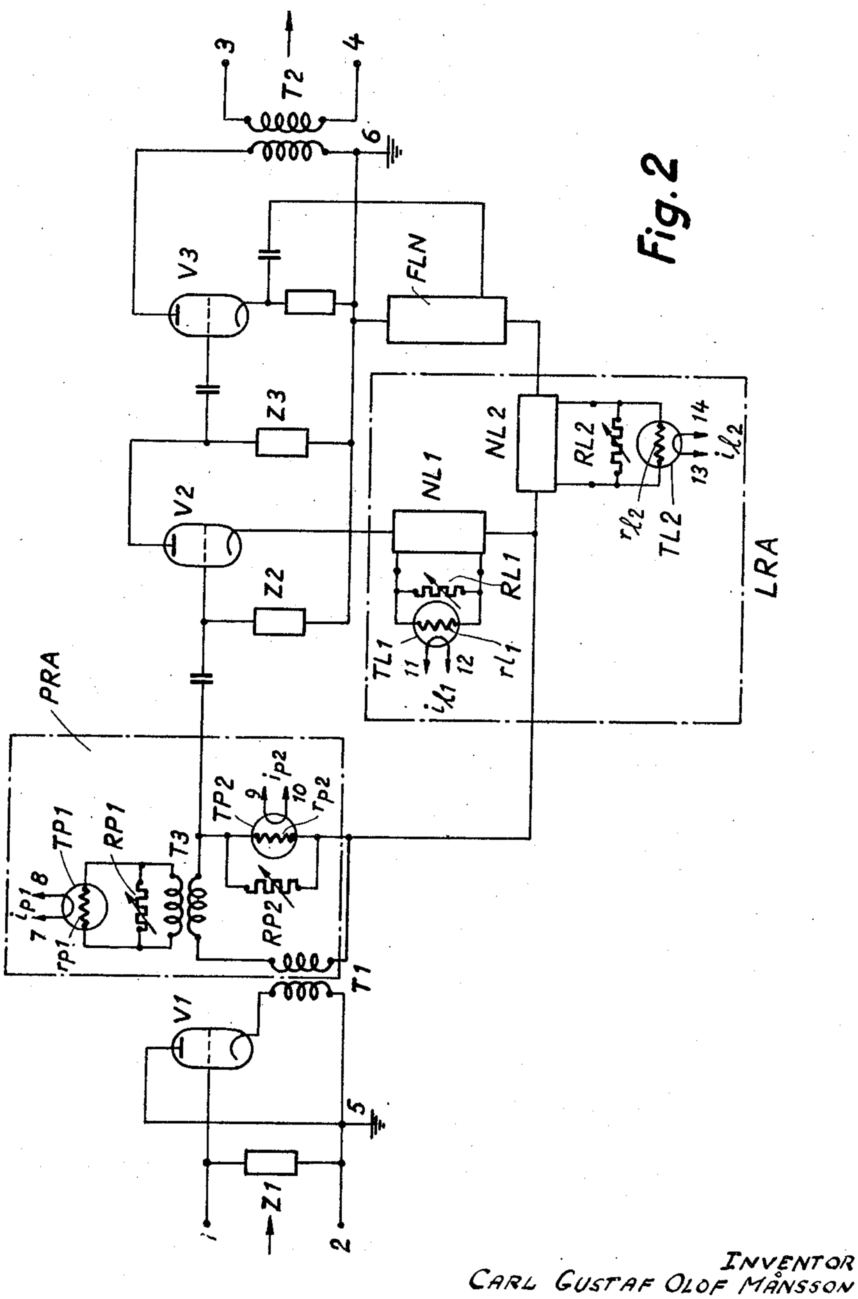
Fig. 2 shows the devices for parallel and slope regulation.

The device for parallel and slope regulation, designated NRP and NRL in Fig. 1, is shown in detail in Fig. 2, which figure, however, is also simplified to some extent, as some of the comprising elements, which have no importance for the understanding of the present invention, have been omitted or joined together with other elements.

The signals coming from the line A (Fig. 1) are lead to the terminals 1, 2 of the circuit formed by the cathode-coupled tube V2, the primary winding of the transformer T1 and the impedance Z1, whereby Z1 serves the main purpose of bringing about correct input impedance in the mentioned circuit. That part of the systems, preceding the transformer T1, can be considered as a generator, having low internal resistance in regard to its effect on the device, designated PRA. Therefore, the secondary winding of the transformer T1 can in the following be regarded as a generator having no losses. The high resistance circuit following the secondary winding serves the purpose of performing the parallel regulation and can practically be characterized as an L-alternating network, the series branch of which consists of the resistance $r'_{p1}$, which is the thermistor-resistance $r_{p1}$, stepped up by means of the transformer T3, and the parallel branch of which consists of the thermistor-resistance $r_{p2}$. The heating winding of the indirectly heated thermistor TP1 is supplied over the terminals 7, 8 with the current $i_{p1}$ from the pilot receiver SMP and the heater winding of the thermistor TP2, forming part of the parallel branch, is supplied over the terminals 9, 10 with the current $i_{p2}$ delivered from the same pilot receiver. The sum of these currents is, as mentioned before, substantially constant. However, this is not quite necessary for the functioning of the level regulation, as the main point is that the currents $i_{p1}$ and $i_{p2}$ vary in opposite directions within the contemplated regulation range. Furthermore, at normal (average) attenuation they are advantageously of the same size.

It can be seen from the figure that the voltage, originating from the secondary winding of the transformer, will be supplied to a voltage divider, consisting of the resistances $r'_{p1}$ and $r_{p2}$. The attenuation of the signal currents coming from the terminals 1, 2 will evidently be substantially determined by the quotient between the resistance $r_{p2}$, over which the signals are taken out, and the sum of the two resistance values $r'_{p1}$ and $r_{p2}$. If the thermistors have a negative temperature coefficient, a large current $i_{p1}$ will then give low resistance $r_{p1}$ in the thermistor TP1 and little attenuation, when at the same time $i_{p2}$ is relatively small and accordingly the resistance $r_{p2}$ in the thermistor TP2 is high. As the attenuation is approximately determined by the quotient between $r_{p2}$ and $r_{p1}$ ($r_{p2}>>1$) and if the thermistors TP1 and TP2 have about the same heating current and the same external temperature conditions, it is evident that changes in the temperature of the air, surrounding the thermistors, have little influence on the regulation of the attenuation. Consequently, the thermistors will principally react together only under the influence of the mentioned currents $i_{p1}$ and $i_{p2}$, which in their turn are only dependent upon the level of the control voltage.

It is evident from Fig. 2 that the two thermistors TP1 and TP2 can be connected in parallel with a resistance RP1 and RP2 respectively, the purpose of which will be further described in the following.

The slope regulating device NRL1, shown in Fig. 1, is further shown in Fig. 2 and consists of a two-stage amplifier containing the tubes V2 and V3 and also a number of other components, which in the diagram have been joined together into the impedances Z2 and Z3. The amplifier output circuit is over a transformer T2 with the terminals 3, 4 connected with the group amplifier LF1, shown in Fig. 1, being the main amplifier of the amplifier station in question. In a receiving terminal station the output side is connected to the different group modulating devices.

The amplifier in Fig. 2 contains a negative feed-back circuit from the cathode of the tube V3 to the grid of the tube V2. The negative feed-back circuit comprises a fine-adjustment network FLN and a device for automatic slope regulation, containing the correction networks NL1 and NL2 terminated by the thermistors TL1 and TL2, which networks, like the thermistors in the parallel-regulating circuits, are arranged in series and in parallel in the feed-back branch. The thermistors TL1 and TL2 receive the currents $i_{11}$ and $i_{12}$ respectively from the pilot receiver SML1 (Fig. 1), and their heater current varies consequently in dependence on the corresponding control voltage.

Starting from the level of the control voltage for slope regulation, the purpose of the slope-regulating networks is to adjust the amplification of the amplifier NRL in such a way, that this, as a function of the frequency, gets a value, that gives a normal level for all frequencies.

Figure 3:
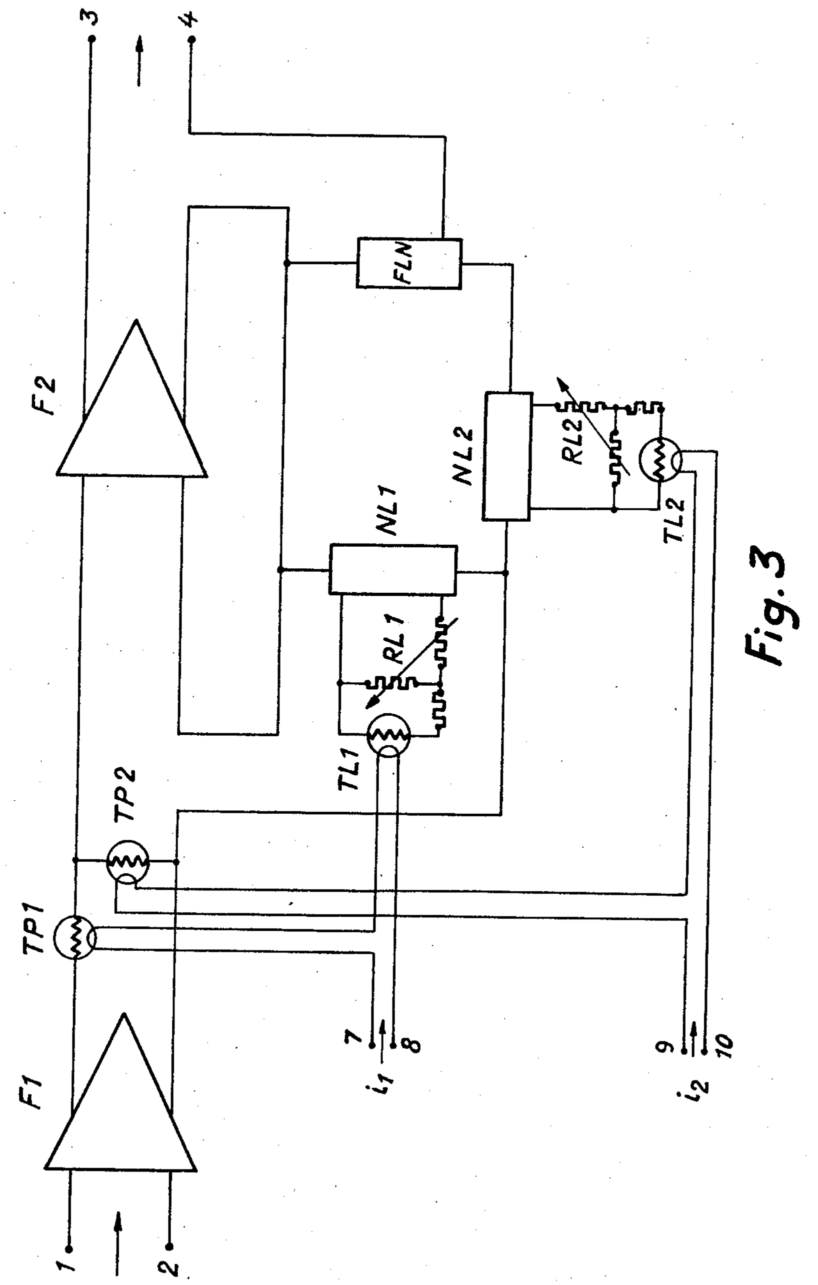
Fig. 3 shows a modified embodiment of these devices.

As has been emphasized above the slope variation is often relatively stably related to the parallel displacement of the attenuation curve. Under such circumstances it may be unnecessary to use two control or pilot currents of different frequencies, for which reason only one control frequency is used. The device according to the invention can also be utilized in such cases, as is shown in the simplified example in Fig. 3. In this device the pilot receivers SML and SMP, shown in Fig. 1, are replaced by a single pilot receiver. The transmission circuit before the parallel regulating thermistors is in Fig. 3 represented by the amplifier F1, and the circuit thereafter by the amplifier F2.

The signals come in as before from the directional filter RF1 (Fig. 1) to the terminals 1, 2 and flow through the amplifier F1, the thermistor device and the amplifier F2 and are fed over the terminals 3, 4 to the directional filter RF2 and the line B. The thermistors TP1 and TP2 are, similarly as in Fig. 2, series and parallel connected respectively in the transmission path between the amplifiers F1 and F2 and receive the currents $i_1$ and $i_2$ from the pilot receiver.

The feed-back circuit contains, similarly as in Fig. 2, the network FLN and the circuits NL1, RL1, TL1 and NL2, RL2 and TL2. The thermistors TL1 and TL2 are in this case fed with the same currents $i_1$ and $i_2$ as are the thermistors TP1 and TP2, which currents originate from one and the same control voltage, regulating the common pilot receiver. The relation between the slope and parallel regulation is adjusted by means of the adjustable resistance networks RL1 and RL2.

The pilot receivers SMP and SML, shown in Fig. 1, are devices which, on a variation of the input voltage (that is the control voltage) deliver two currents, the sum of which suitably is mainly constant the whole time. These currents, as a function of the control voltage U, are shown by the curves in Fig. 4. The current $i_1$, having the value zero at low control voltage, rises rapidly to a constant level and then quickly approaches zero again at a certain threshold value. On the other hand the current $i_2$ maintains its low level until $i_1$ starts to fall and reaches thereafter a high constant value, when $i_1$ approaches zero. According to Fig. 4 the sum of the two currents is approximately constant the whole time and the current curves cut each other within the range, where $i_1$ falls and $i_2$ rises. The point of intersection between the two curves corresponds to the control voltage $U_n$, which prevails at "normal" states of the weather, that is when the carrier frequency system is subjected to average temperature and atmospheric conditions. The normal regulating range falls within $\pm 5\%$ seen from the normal control voltage $U_n$ in the point of intersection for the curves. The curves for $i_1$ and $i_2$ are within this range approximately straight lines. External conditions, corresponding to fine weather, correspond to the upper limit of the control voltage and those conditions, which correspond to extremely bad weather, for instance hoar-frost, correspond to the lower limit of the regulating range.

Figure 5:
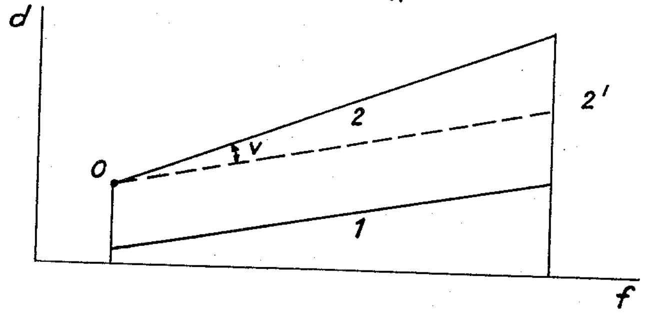
Fig. 5 shows diagrammatically the line attenuation for a carrier-frequency transmitting system as a function of the frequency of the transmitted signals.

A diagram is shown in Fig. 5, covering the earlier mentioned characteristics for attenuation for open wire systems at different frequencies. The attenuation $d$ as a function of the transmitted frequency $f$ can with open wire transmission normally be regarded as represented by a straight line. The straight line 1 in the figure indicates the course of the attenuation under certain definite states of the weather, in case no lever regulation takes place. It is evident that in such a case the attenuation at low frequencies would be less than at high frequencies. If the state of the weather along the transmission path should change in the direction towards higher line attenuation, that is, if the temperature falls, the attenuation will for instance have the course represented by the curve 2 as a function of the frequency. The attenuation at lower frequencies will evidently increase considerably less than the attenuation at high frequencies and, therefore, the slope of the line 2 will be greater than that of the line 1. This changed position of the attenuation curve can obviously be represented, partly by a parallel displacement upwards of the line 1 to the dashed line indicated 2', and partly by this line 2' being turned an angle $v$ around the point 0. The parallel and the slope regulating devices are meant to compensate these two displacements of the attenuating curve, so that as constant a level as possible is obtained over the whole transmitted frequency range.

The device according to the invention involves several advantages as compared with earlier known devices for level regulation in multichannel carrier-frequency transmission systems.

It is thereby possible to make use of either two control voltages of different frequencies for the parallel and the slope regulation or to use one single control voltage for these two functions. When one control voltage is used for regulating both parallel and slope, a regulating device, normally designed for two control voltages, does not require to be modified in any other way than certain interconnections being introduced between its two thermistor groups, so that the currents, originating from the pilot receivers and dependent on the control voltages, can be supplied to both groups of thermistors. By making use of one control voltage, the ratio between the slope regulation and the parallel regulation is furthermore adjusted in a simple way by means of variable resistance networks connected in series with the thermistors (Fig. 3).

Figure 4:
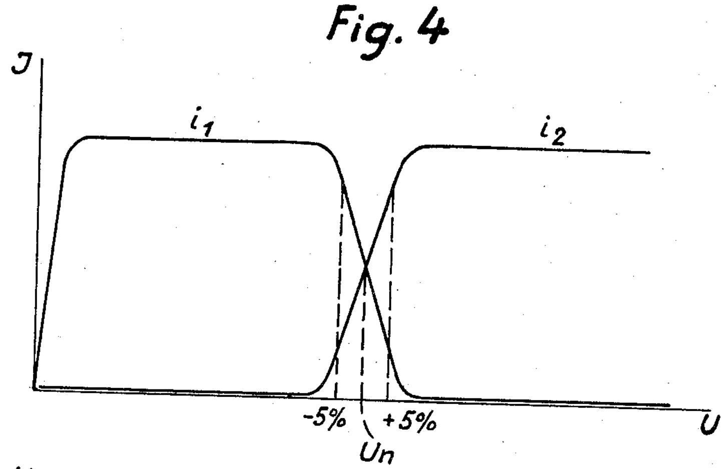
Fig. 4 shows the appearance of the regulating currents, carried to the devices in Figs. 2 and 3.

The "quiescent" amplification of the regulating devices, that is the amplification, to which the devices adjust themselves if the control voltage $U_m$ in Fig. 4 for some reason falls off, is adjusted by suitable dimensioning of the resistances RP1 and RL1, connected in parallel with the thermistors.

In earlier known designs, as previously mentioned, the amplifiers have been adjusted for maximum amplification when the control voltages drop away. This inconvenience has been eliminated with the present invention by forming two currents out of the incoming control voltage, which two currents approach zero as shown in Fig. 4, when the mentioned control voltage fails to appear by letting these currents operate separately upon individual thermistors, one connected in a series branch, the other in a shunt branch of a regulating network in such a way, that the attenuation in the network in question is substantially determined by the ratio between the resistances of the thermistors, and generally is independent of the absolute values of these resistances.

I claim:

1. A device for automatic level regulation in multichannel carrier frequency transmission systems having a pilot signal comprising a regulating amplifier having an input circuit and a feed-back circuit, and attenuation equalizer in at least one circuit including at least one series connected and one parallel connected temperature responsive impedance, heating means associated with each of said impedances, means generating at least two different currents for individually energizing said heaters, means controlling said generating means in response to changes in said pilot signal to produce currents in said heaters variable in opposite directions as the magnitude of said pilot signal changes and with the sum of said currents remaining constant, and means in said generator to interrupt said currents upon failure of said pilot signal.

2. A device according to claim 1, wherein each of said circuits includes a series connected and a parallel connected temperature responsive impedance.

3. A device according to claim 1, wherein means are interconnected with said impedances to limit the maximum value thereof and to produce a predetermined amplification characteristic upon failure of said pilot signal.

4. A device for automatic level regulation in multichannel carrier frequency transmission systems having a pilot signal comprising a regulating amplifier having input and feedback circuits, an attenuation equalizer in at least one circuit, said equalizer including at least one series connected and at least one parallel connected temperature responsive impedance network, heating means associated with each of said networks, and means for generating at least two different currents for individually energizing said heaters, said generating means being responsive to changes in the pilot signal to produce currents in said heaters variable in opposite directions as the magnitude of said pilot signal changes with the sum of said currents remaining constant, and said generator being further responsive to interrupt said currents upon failure of the pilot signal.

5. A device according to claim 4 wherein each of said networks includes a thermistor responsive to the associated heating means and said device further includes a variable resistance connected in parallel with each thermistor for adjusting the attenuation of said equalizer upon failure of the pilot signal.

References Cited in the file of this patent

UNITED STATES PATENTS

| | | |
|---|---|---|
| 2,096,760 | Purington | Oct. 26, 1937 |
| 2,326,871 | Mallinckrodt | Aug. 17, 1943 |
| 2,331,530 | Zinn | Oct. 12, 1943 |
| 2,345,066 | Nylund | Mar. 28, 1944 |

FOREIGN PATENTS

| | | |
|---|---|---|
| 933,015 | France | Dec. 17, 1947 |